(12) United States Patent
Abbaszadeh et al.

(10) Patent No.: US 10,805,324 B2
(45) Date of Patent: Oct. 13, 2020

(54) CLUSTER-BASED DECISION BOUNDARIES FOR THREAT DETECTION IN INDUSTRIAL ASSET CONTROL SYSTEM

(71) Applicant: General Electric Company, Schenectady, NY (US)

(72) Inventors: Masoud Abbaszadeh, Clifton Park, NY (US); Cody Joe Bushey, Clifton Park, NY (US); Lalit Keshav Mestha, North Colonie, NY (US); Daniel Francis Holzhauer, Santa Clarita, CA (US)

(73) Assignee: General Electric Company, Schenectady, NY (US)

( * ) Notice: Subject to any disclaimer, the term of this patent is extended or adjusted under 35 U.S.C. 154(b) by 748 days.

(21) Appl. No.: 15/397,062

(22) Filed: Jan. 3, 2017

(65) Prior Publication Data

US 2018/0191758 A1 Jul. 5, 2018

(51) Int. Cl.
*H04L 29/06* (2006.01)
*G06N 20/00* (2019.01)
(Continued)

(52) U.S. Cl.
CPC .......... *H04L 63/1425* (2013.01); *G05B 19/00* (2013.01); *G05B 23/00* (2013.01); *G06N 20/00* (2019.01); *H04L 63/1441* (2013.01)

(58) Field of Classification Search
CPC . H04L 63/1425; H04L 63/1441; G06N 20/00; G05B 19/00; G05B 23/00
See application file for complete search history.

(56) References Cited

U.S. PATENT DOCUMENTS 7,739,082 B2   6/2010   Scherrer
7,792,770 B1 *  9/2010   Phoha ................... G06N 20/00
                                                 706/45

(Continued)

FOREIGN PATENT DOCUMENTS

CN         102607641 A        7/2012

OTHER PUBLICATIONS

Kiss, Istvan et al., "Data Clustering-based Anomaly Detection in Industrial Control Systems," Intelligent Computer Communication and Processing (ICCP), 2014 IEEE International Conference on, Sep. 4-6, 2014, (pp. 275-281, 7 total pages).

(Continued)

*Primary Examiner* — Matthew T Henning
(74) *Attorney, Agent, or Firm* — Buckley, Maschoff & Talwalkar LLC

(57) ABSTRACT

A threat detection model creation computer may receive a series of monitoring node values (representing normal and/ or threatened operation of the industrial asset control system) and generate a set of normal feature vectors. The threat detection model creation computer may identify a first cluster and a second cluster in the set of feature vectors. The threat detection model creation computer may then automatically determine a plurality of cluster-based decision boundaries for a threat detection model. A first potential cluster-based decision boundary for the threat detection model may be automatically calculated based on the first cluster in the set of feature vectors. Similarly, the threat detection model creation computer may also automatically calculate a second potential cluster-based decision boundary for the threat detection model based on the second cluster in the set of feature vectors.

19 Claims, 18 Drawing Sheets

(51) Int. Cl.
    *G05B 19/00*     (2006.01)
    *G05B 23/00*     (2006.01)

(56) References Cited

U.S. PATENT DOCUMENTS

| | | |
|---|---|---|
| 8,150,783 B2 | 4/2012 | Gonsalves et al. |
| 9,401,926 B1 | 7/2016 | Dubow et al. |
| 2010/0017870 A1 | 1/2010 | Kargupta |
| 2011/0213788 A1 | 9/2011 | Zhao et al. |
| 2012/0316835 A1 | 12/2012 | Maeda et al. |
| 2016/0012235 A1 | 1/2016 | Lee et al. |
| 2016/0065603 A1 | 3/2016 | Dekel et al. |
| 2017/0063896 A1* | 3/2017 | Muddu ................. G06F 16/254 |
| 2017/0308801 A1* | 10/2017 | Cai ........................ G06N 5/047 |

OTHER PUBLICATIONS

Kiss, Istvan et al., "A Clustering-based Approach to Detect Cyber Attacks in Process Control Systems," Industrial Informatics (INDIN), 2015 IEEE 13th International Conference on, Jul. 22-24, 2015, (pp. 142-148, 7 total pages).

* cited by examiner

| INDUSTRIAL ASSET IDENTIFIER 1602 | GLOBAL CLUSTER IDENTIFIER 1604 | CENTROID 1606 | GLOBAL FEATURES AND BOUNDARIES 1608 |
|---|---|---|---|
| IA_1001 | GC_101 | -0.75, 0.25 | |
| IA_1001 | GC_102 | 1.50, 2.75 | |
| IA_1001 | GC_103 | -0.8, 0.9 | |
| IA_1001 | GC_104 | 0.12, -0.21 | |

| MONITORING NODE IDENTIFIER 1702 | MONITORING NODE VALUES 1704 | FEATURES 1706 | FEATURE VECTOR 1708 | CLOSEST CLUSTER IDENTIFIER 1710 | RESULT 1712 |
|---|---|---|---|---|---|
| MN_2001 | 1.43, 1.09, 1.61, 1.30, 1.83, 1.36, 1.29, 1.83, 1.21 | | | C_103 | NORMAL |
| MN_2002 | 1.50, 1.56, 1.24, 1.96, 1.32, 1.32, 0.54, 2.11, 1.06 | | | C_101 | NORMAL |
| MN_2003 | 1.68, 1.43, 1.17, 1.53, 1.34, 0.42, 1.41, 1.75, 2.17 | | | C_101 | THREAT |
| MN_2004 | 1.75, 1.2-, 1.02, 1.19, 0.93, 1.73, 1.18, 0.81, 1.90 | | | C_102 | NORMAL |

1700

CLUSTER-BASED DECISION BOUNDARIES FOR THREAT DETECTION IN INDUSTRIAL ASSET CONTROL SYSTEM

BACKGROUND

Industrial asset control systems that operate physical systems (e.g., associated with power turbines, jet engines, locomotives, autonomous vehicles, etc.) are increasingly connected to the Internet. As a result, these control systems may be vulnerable to threats, such as cyber-attacks (e.g., associated with a computer virus, malicious software, etc.), that could disrupt electric power generation and distribution, damage engines, inflict vehicle malfunctions, etc. Current methods primarily consider threat detection in Information Technology ("IT," such as, computers that store, retrieve, transmit, manipulate data) and Operation Technology ("OT," such as direct monitoring devices and communication bus interfaces). Cyber-threats can still penetrate through these protection layers and reach the physical "domain" as seen in 2010 with the Stuxnet attack. Such attacks can diminish the performance of a control system and may cause a total shut down or even catastrophic damage to a plant. Currently, Fault Detection Isolation and Accommodation ("FDIA") approaches only analyze sensor data, but a threat might occur in connection with other types of threat monitoring nodes. Also note that FDIA is limited only to naturally occurring faults in one sensor at a time. FDIA systems do not address multiple simultaneously occurring faults as in the case of malicious attacks. Moreover, industrial assets may operate in various states (e.g. associated with different Mega Watt ("MW") levels, temperatures, etc.) and different states might exhibit different normal operating characteristics. As a result, creation of a suitable threat detection system can be difficult—especially when a substantial number of monitoring nodes of different types are evaluated and states of operation need to be considered. It would therefore be desirable to facilitate creation of a suitable threat detection system to protect an industrial asset control system from cyber threats in an automatic and accurate manner.

SUMMARY

According to some embodiments, a threat detection model creation computer may receive a series of monitoring node values (representing normal and/or threatened operation of the industrial asset control system) and generate a set of normal feature vectors. The threat detection model creation computer may then automatically determine a plurality of potential cluster-based decision boundaries for a threat detection model.

Some embodiments comprise: means for receiving, from a space data source for each of a plurality of monitoring nodes, a series of monitoring node values over time that represent at least one of: (i) a normal operation of the industrial asset control system, and (ii) a threatened operation of the industrial asset control system; means for automatically determining a plurality of potential cluster-based decision boundaries for a threat detection model based on the first cluster in the set of feature vectors. Moreover, some embodiments might be associated with: means for receiving streams of monitoring node signal values over time that represent a current operation of the industrial asset control system; for each stream of monitoring node signal values, means for generating a current monitoring node feature vector; means for selecting an appropriate decision boundary, the appropriate decision boundary separating a normal state from an abnormal state for that monitoring node in association with a cluster; means for comparing the generated current monitoring node feature vectors with the selected appropriate decision boundary; and means for automatically transmitting a threat alert signal based on results of said comparisons.

Some technical advantages of some embodiments disclosed herein are improved systems and methods to facilitate creation of a suitable threat detection system to protect an industrial asset control system from cyber threats in an automatic and accurate manner.

BRIEF DESCRIPTION OF THE DRAWINGS

FIG. 16 is a tabular portion of global database in accordance with some embodiments.

FIG. 17 is a tabular portion of a monitoring node database according to some embodiments.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Industrial control systems that operate physical systems are increasingly connected to the Internet. As a result, these control systems may be vulnerable to threats and, in some cases, multiple attacks may occur simultaneously. Existing approaches to protect an industrial control system, such as FDIA approaches, may not adequately address these threats—especially when a substantial number of monitoring nodes of different types are evaluated and various states of operation need to be considered. Moreover, the operational space of cyber-physical systems may be non-linear (e.g., a gas turbine running at different loads of 40 MW to 180 MW may exhibit non-linear characteristics). Moreover, collected data from various monitoring nodes (e.g., sensors) may be skewed, which can create problems when an accurate detection algorithm needs to perform under various operational conditions and/or data conditions.

Figure 1:
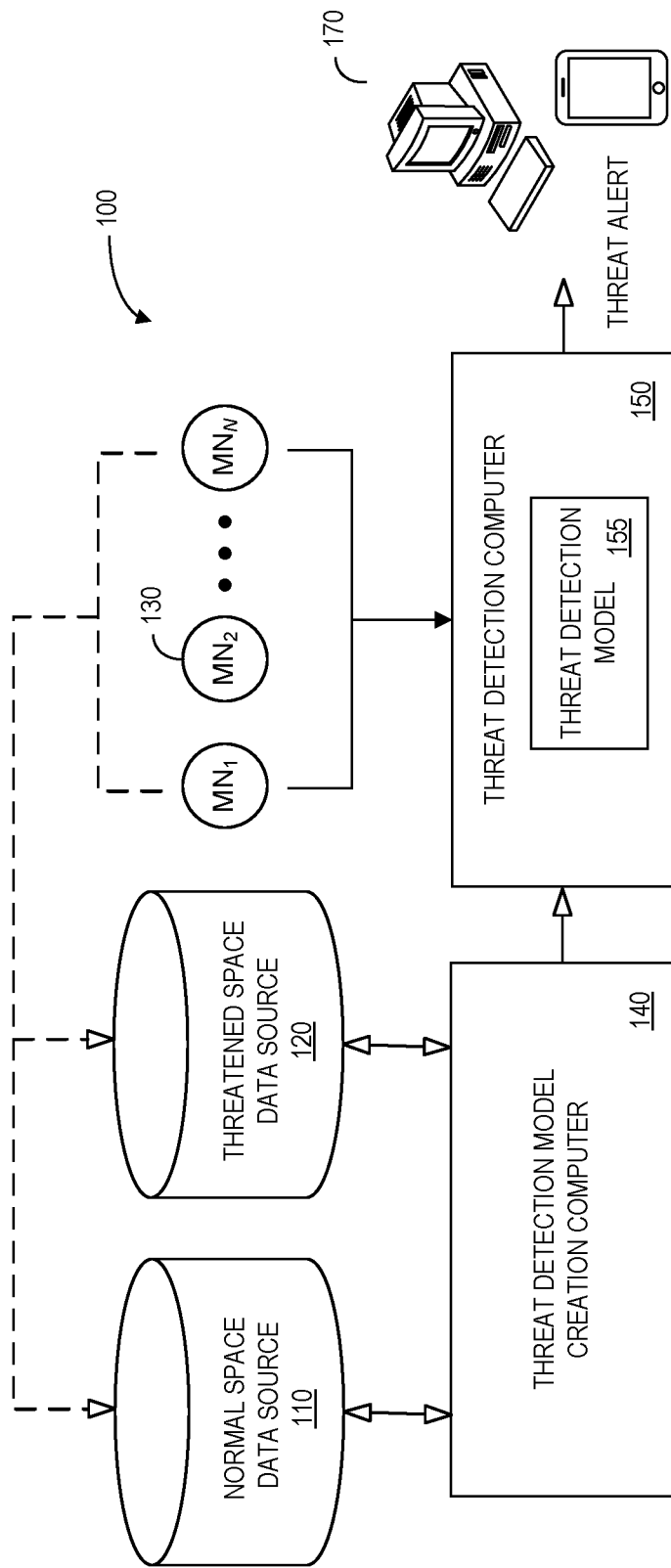
FIG. 1 is a high-level block diagram of a system that may be provided in accordance with some embodiments.

It would therefore be desirable to facilitate creation of a suitable threat detection system to protect an industrial asset control system from cyber threats in an automatic and accurate manner. FIG. 1 is a high-level architecture of a system 100 in accordance with some embodiments. The system 100 may include a "normal space" data source 110 and a "threatened space" data source 120. The normal space data source 110 might store, for each of a plurality of "monitoring nodes" 130, a series of normal values over time that represent normal operation of an industrial asset control system (e.g., generated by a model or collected from actual monitoring node 130 data as illustrated by the dashed line in FIG. 1). As used herein, the phrase "monitoring node" might refer to, for example, sensor data, signals sent to actuators, motors, pumps, and auxiliary equipment, intermediary parameters that are not direct sensor signals not the signals sent to auxiliary equipment, and/or control commands. These may represent, for example, threat monitoring nodes that receive data from the threat monitoring system in a continuous fashion in the form of continuous signals or streams of data or combinations thereof. Moreover, the nodes may be used to monitor occurrences of cyber-threats or abnormal events. This data path may be designated specifically with encryptions or other protection mechanisms so that the information may be secured and cannot be tampered with via cyber-attacks. The threatened space data source 120 might store, for each of the monitoring nodes 130, a series of threatened values that represent a threatened operation of the industrial asset control system (e.g., when the system is experiencing a cyber-attack). Although both a normal space data source 110 and a threatened space data source 120 are illustrated in FIG. 1, note that embodiments might instead be associated with a single space data source (e.g., containing only normal data, only threatened data, both normal and threatened data, etc.).

Information from the normal space data source 110 and the threatened space data source 120 may be provided to a threat detection model creation computer 140 that uses this data to create a decision boundary (that is, a boundary that separates normal behavior from threatened behavior). The decision boundary may then be used by a threat detection computer 150 executing a threat detection model 155. The threat detection model 155 may, for example, monitor streams of data from the monitoring nodes 130 comprising data from sensor nodes, actuator nodes, and/or any other critical monitoring nodes (e.g., monitoring nodes $MN_1$ through $MN_N$), calculate a "feature" for each monitoring node based on the received data, and "automatically" output a threat alert signal to one or more remote monitoring devices 170 when appropriate (e.g., for display to a user). According to some embodiments, a threat alert signal might be transmitted to a unit controller, a plant Human-Machine Interface ("HMI"), or to a customer via a number of different transmission methods. Note that one receiver of a threat alert signal might be a cloud database that correlates multiple attacks on a wide range of plant assets. As used herein, the term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. Moreover, term "automatically" may refer to, for example, actions that can be performed with little or no human intervention. According to some embodiments, information about a detected threat may be transmitted back to the industrial control system.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The threat detection model creation computer 140 may store information into and/or retrieve information from various data stores, such as the normal space data source 110 and/or the threatened space data source 120. The various data sources may be locally stored or reside remote from the threat detection model creation computer 140 (which might be associated with, for example, offline or online learning). Although a single threat detection model creation computer 140 is shown in FIG. 1, any number of such devices may be included. Moreover, various devices described herein might be combined according to embodiments of the present invention. For example, in some embodiments, the threat detection model creation computer 140 and one or more data sources 110, 120 might comprise a single apparatus. The threat detection model creation computer 140 functions may be performed by a constellation of networked apparatuses, in a distributed processing or cloud-based architecture.

A user may access the system 100 via one of the monitoring devices 170 (e.g., a Personal Computer ("PC"), tablet, or smartphone) to view information about and/or manage threat information in accordance with any of the embodiments described herein. In some cases, an interactive graphical display interface may let a user define and/or adjust certain parameters (e.g., threat detection trigger levels) and/or provide or receive automatically generated recommendations or results from the threat detection model creation computer 140 and/or threat detection computer 150.

Figure 2:
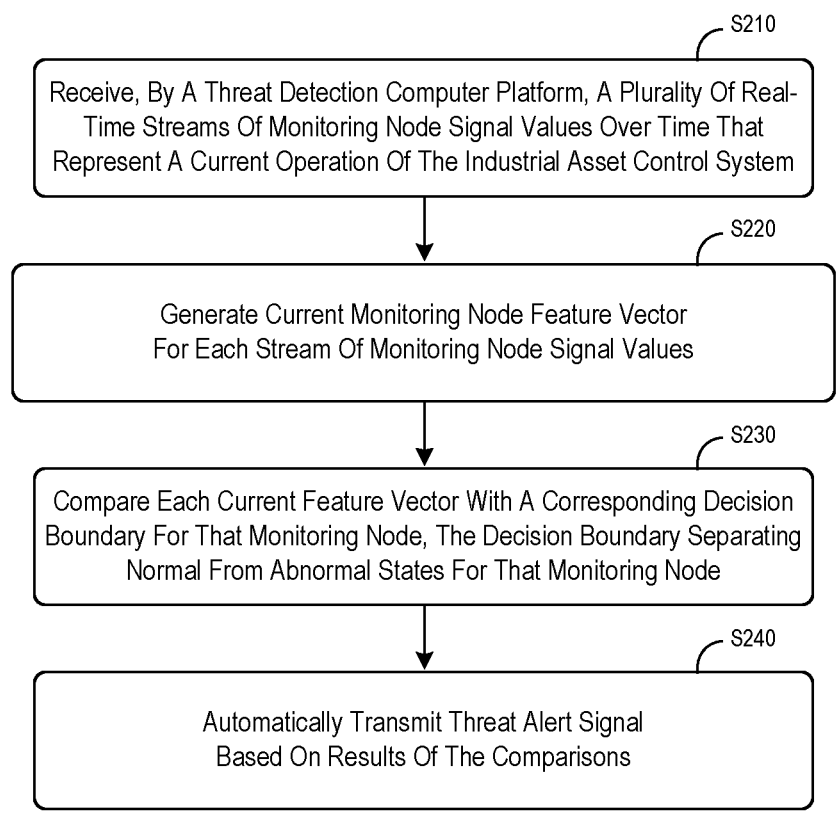
FIG. 2 is a method according to some embodiments.

For example, FIG. 2 illustrates a method that might be performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a plurality of real-time monitoring node signal inputs may receive streams of monitoring node signal values over time that represent a current operation of an industrial asset control system. At least one of the monitoring nodes (e.g., controller nodes, etc.) may be associated with, for example, sensor data, an auxiliary equipment input signal, a control intermediary parameter, and/or a control logic value.

At S220, a threat detection computer platform may receive the streams of monitoring node signal values and, for each stream of monitoring node signal values, generate a current monitoring node feature vector. According to some embodiments, at least one of the current monitoring node feature vectors is associated with principal components, statistical features, deep learning features, frequency domain features, time series analysis features, logical features, geographic or position based locations, and/or interaction features.

At S230, each generated current monitoring node feature vector may be compared to a corresponding decision boundary (e.g., a linear boundary, non-linear boundary, multi-dimensional boundary, etc.) for that monitoring node, the decision boundary separating a normal state from an abnormal state for that monitoring node. According to some embodiments, at least one monitoring node is associated with a plurality of multi-dimensional decision boundaries and the comparison at S230 is performed in connection with each of those boundaries. Note that a decision boundary might be generated, for example, in accordance with a feature-based learning algorithm and a high fidelity model or a normal operation of the industrial asset control system and with any of the cluster-based embodiments described herein. Moreover, at least one decision boundary may exist in a multi-dimensional space and be associated with data generated from a dynamic model, design of experiments such as, a full factorial design, Taguchi screening design, a central composite methodology, a Box-Behnken methodology, and a real-world operating conditions methodology. In addition, a threat detection model associated with a decision boundary might, according to some embodiments, be dynamically adapted based on a transient condition, a steady state model of the industrial asset control system, and/or data sets obtained while operating the system as in self-learning systems from incoming data stream.

At S240, the system may automatically transmit a threat alert signal (e.g., a notification message, etc.) based on results of the comparisons performed at S230. The threat might be associated with, for example, an actuator attack, a controller attack, a monitoring node attack, a plant state attack, spoofing, financial damage, unit availability, a unit trip, a loss of unit life, and/or asset damage requiring at least one new part. According to some embodiments, one or more response actions may be performed when a threat alert signal is transmitted. For example, the system might automatically shut down all or a portion of the industrial asset control system (e.g., to let the detected potential cyber-attack be further investigated). As other examples, one or more parameters might be automatically modified, a software application might be automatically triggered to capture data and/or isolate possible causes, etc. Note that a threat alert signal might be transmitted via a cloud-based system, such as the PREDIX® field agent system. Note that according to some embodiments, a cloud approach might also be used to archive information and/or to store information about boundaries. In yet another embodiment, alerts may be used to automatically initiate an accommodation control loop to keep the system running while the attacks are in progression and are under scrutiny.

According to some embodiments, the system may further localize an origin of the threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in the threat alert signal.

Some embodiments described herein may take advantage of the physics of a control system by learning a priori from tuned high fidelity equipment models and/or actual "on the job" data to detect single or multiple simultaneous adversarial threats to the system. Moreover, according to some embodiments, all monitoring node data may be converted to features using advanced feature-based methods, and the real-time operation of the control system may be monitored in substantially real-time. Abnormalities may be detected by classifying the monitored data as being "normal" or disrupted (or degraded). This decision boundary may be constructed using dynamic models and may help enable early detection of vulnerabilities (and potentially avert catastrophic failures) and allow an operator to restore the control system to normal operation in a timely fashion.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with DoE techniques. Moreover, multiple algorithmic methods (e.g., support vector machines or machine learning techniques) may be used to generate decision boundaries. Since boundaries may be driven by measured data (or data generated from high fidelity models), defined boundary margins may help to create a threat zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account an operator's knowledge about system operation (e.g., the differences between normal and abnormal operation).

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple monitoring nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Thus, some embodiments may provide an advanced anomaly detection algorithm to detect cyber-attacks on, for example, key gas turbine control sensors. The algorithm may identify which signals(s) are being attacked using monitoring node-specific decision boundaries and may inform a control system to take accommodative actions. In particular, a detection and localization algorithm might detect whether a sensor, auxiliary equipment input signal, control intermediary parameter, or control command are in a normal or anomalous state. Some examples of gas turbine monitoring nodes that might be analyzed include: critical control sensors (e.g., a generator power transducer signal, a gas turbine exhaust temperature thermocouple signal, a gas turbine speed signal, etc.); control system intermediary parameters (e.g., generator power, gas turbine exhaust temperature, compressor discharge pressure, compressor discharge temperature, compressor pressure ratio, fuel flow, compressor inlet temperature, guide vane angle, fuel stroke reference, compressor bleed valve, inlet bleed heat valve, etc.); auxiliary equipment input signals (e.g., signals sent to actuators, motors, pumps, etc.); and/or control commands to controller.

Some embodiments of the algorithm may utilize feature-based learning techniques based on high fidelity physics models and/or machine operation data (which would allow the algorithm to be deployed on any system) to establish a high dimensional decision boundary. As a result, detection may occur with more precision using multiple signals, making the detection more accurate with less false positives. Moreover, embodiments may detect multiple attacks on monitoring node data, and rationalize where the root cause attack originated. For example, the algorithm may decide if a signal is anomalous because of a previous signal attack, or if it is instead independently under attack. This may be accomplished, for example, by monitoring the evolution of the features as well as by accounting for time delays between attacks.

Figure 3:
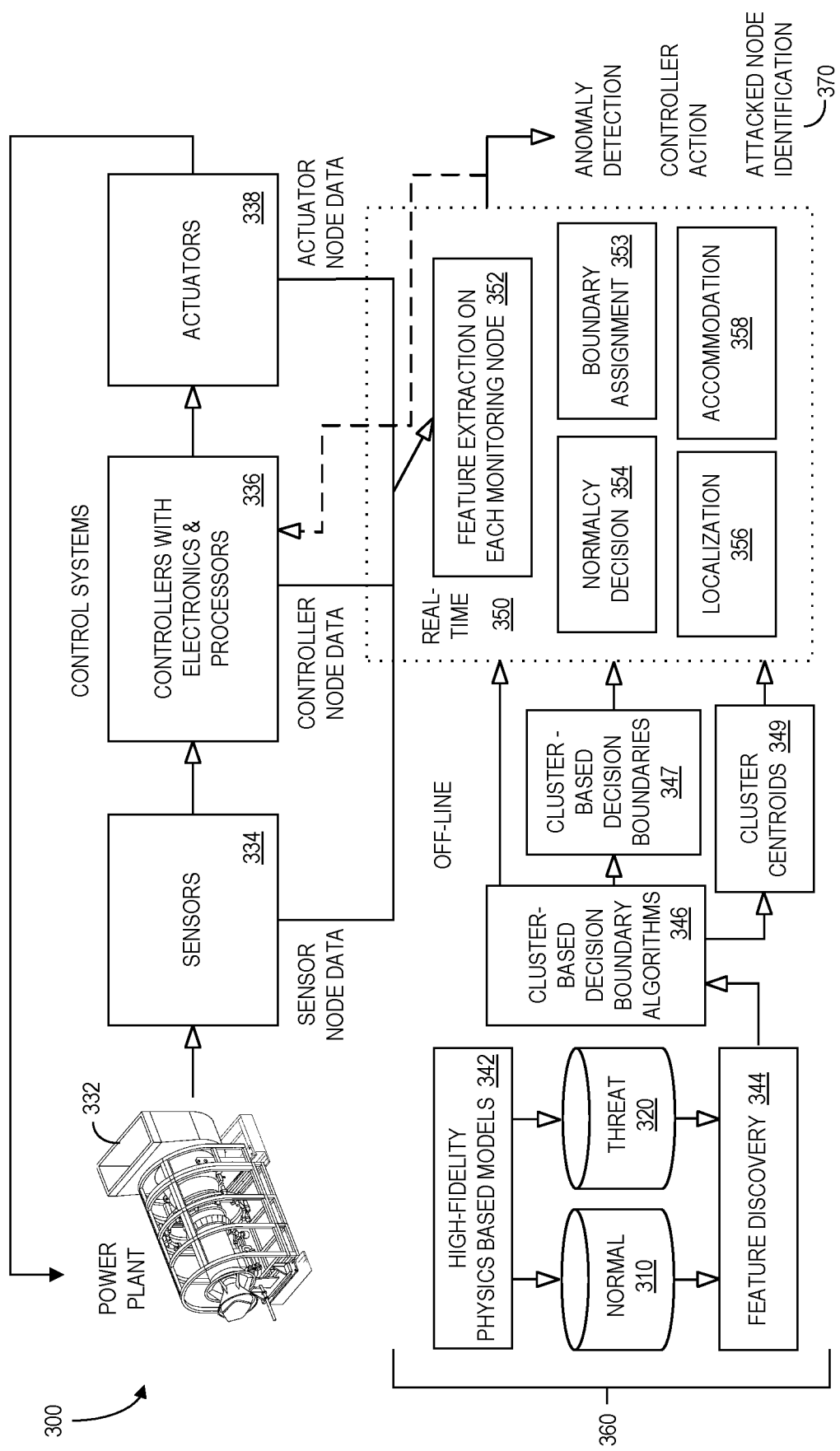
FIG. 3 is threat alert system in accordance with some embodiments.

A cyber-attack detection and localization algorithm may process a real-time turbine signal data stream and then compute features (multiple identifiers) which can then be compared to the sensor specific decision boundary. A block diagram of a system 300 utilizing a sensor specific gas turbine cyber-attack detection and localization algorithm according to some embodiments is provided in FIG. 3. In particular, a power plant 332 provides information to sensors 334 which helps controllers with electronics and processors 336 adjust actuators 338. A threat detection system 360 may include one or more high-fidelity physics based models 342 associated with the power plant 332 to create normal data 310 and/or threat data 320. The normal data 310 and threat data 320 may be accessed by a feature discovery component 344 and processed by cluster-based decision boundary algorithms 346 to create multiple cluster-based decision boundaries 347 and cluster centroids 349 while off-line (e.g., not necessarily while the power plant 332 is operating). The decision boundary algorithms 346 may generate a threat model including decision boundaries for various monitoring nodes. Each decision boundary may separate two data sets in a high dimensional space which is constructed by running a binary classification algorithm, such as a support vector machine using the normal data 310 and threat data 320 for each monitoring node signal (e.g., from the sensors 334, controllers 336, and/or the actuators 338).

A real-time threat detection platform 350 may receive the boundaries along with streams of data from the monitoring nodes. The platform 350 may include a feature extraction on each monitoring node element 352, a boundary assignment element 353, and a normalcy decision 354 with an algorithm to detect attacks in individual signals using sensor specific cluster-based decision boundaries, as well rationalize attacks on multiple signals, to declare which signals were attacked, and which became anomalous due to a previous attack on the system via a localization module 356. An accommodation element 358 may generate outputs 370, such as an anomaly decision indication (e.g., threat alert signal), a controller action, and/or a list of attached monitoring nodes.

During real-time detection, contiguous batches of monitoring node data may be processed by the platform 350, normalized and the feature vector extracted. The location of the vector for each signal in high-dimensional feature space may then be compared to a corresponding cluster-based decision boundary after assigning to the cluster via boundary assignment element 353. If it falls within the attack region, then a cyber-attack may be declared. The algorithm may then make a decision about where the attack originally occurred. An attack may sometimes be on the actuators 338 and then manifested in the sensors 334 data. Attack assessments might be performed in a post decision module (e.g., the localization element 356) to isolate whether the attack is related to any of the sensor, controller, or actuator (e.g., indicating which part of the monitoring node). This may be done by individually monitoring, overtime, the location of the feature vector with respect to the corresponding cluster-based decision boundary. For example, when a sensor 334 is spoofed, the attacked sensor feature vector will cross the one cluster-based decision boundary earlier than the rest of the vectors as described with respect to FIGS. 4 through 6. If a sensor is declared to be anomalous, and the load command to the auxiliary equipment is later determined to be anomalous, it may be determined that the original attack, such as signal spoofing, occurred on the sensor 334. Conversely, if the signal to the auxiliary equipment was determined to be anomalous first, and then later manifested in the sensor 334 feedback signal, it may be determined that the signal to the equipment was initially attacked.

According to some embodiments, it may be detected whether or not a signal is in the normal operating space (or abnormal space) through the use of localized decision boundaries and real time computation of the specific signal features. Moreover, an algorithm may differentiate between a sensor being attacked as compared to a signal to auxiliary equipment being attacked. The control intermediary parameters and control logical(s) may also be analyzed using similar methods. Note that an algorithm may rationalize signals that become anomalous. An attack on a signal may then be identified.

Figure 4:
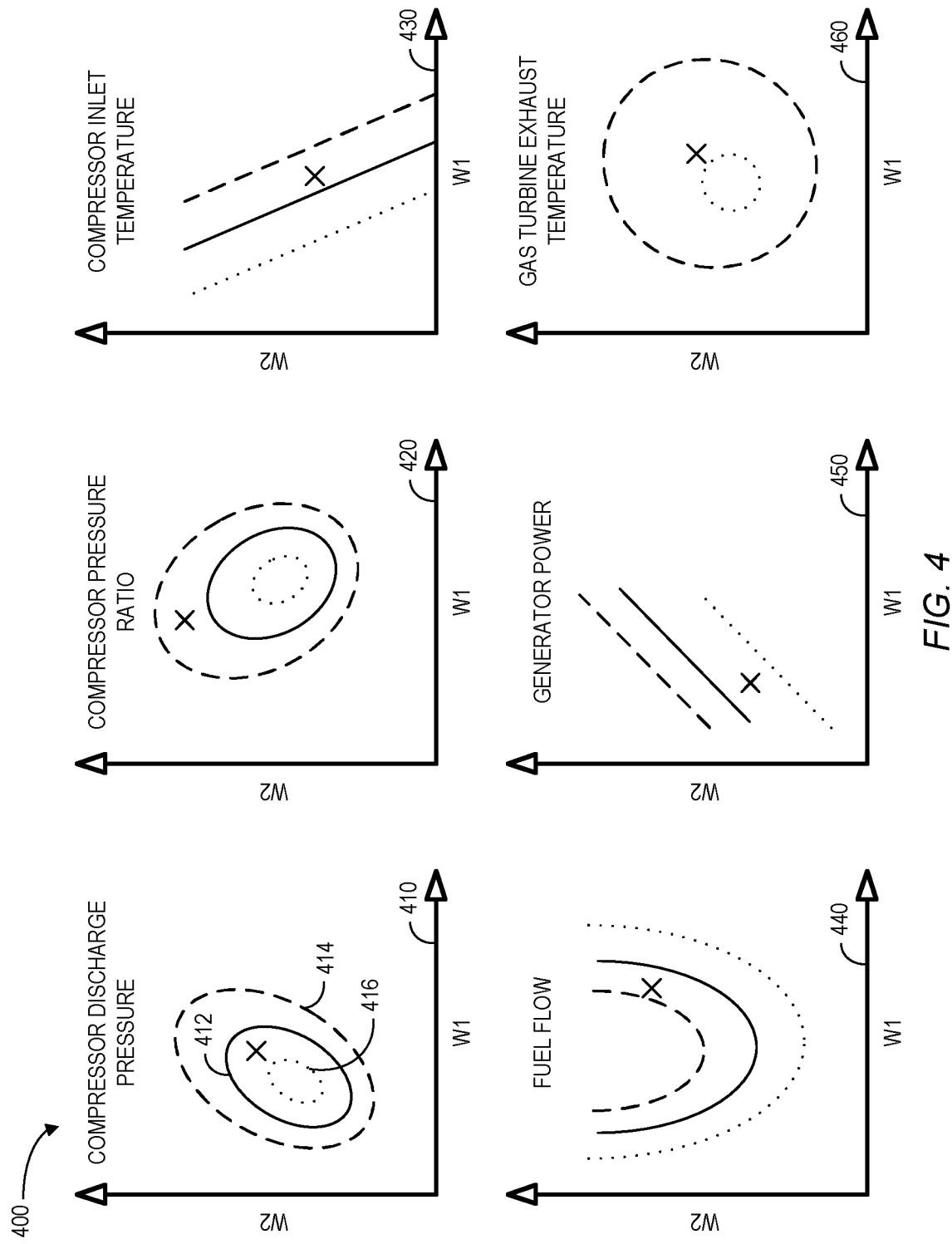
FIGS. 4 through 6 illustrate boundaries and feature vectors for various monitoring node parameters according to some embodiments.

FIG. 4 illustrates 400 boundaries and feature vectors for various monitoring node parameters in accordance with some embodiments. In particular, for each parameter a graph includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") that is performed on the input data. PCA might be one of the features that might be used by the algorithm to characterize the data, but note that other features could be leveraged.

A graph is provided for compressor discharge temperature 410, compressor pressure ratio 420, compressor inlet temperature 430, fuel flow 440, generator power 450, and gas turbine exhaust temperature 460. Each graph includes a hard boundary 412 (solid curve), minimum boundary 416 (dotted curve), and maximum boundary 414 (dashed curve) and an indication associated with current feature location for each monitoring node parameter (illustrated with an "X" on the graph). As illustrated in FIG. 4, the current monitoring node location is between the minimum and maximum boundaries (that is, the "X" is between the dotted and dashed lines). As a result, the system may determine that the operation of the industrial asset control system is normal (and no threat is being detected indicating that the system is currently under attack).

Figure 5:
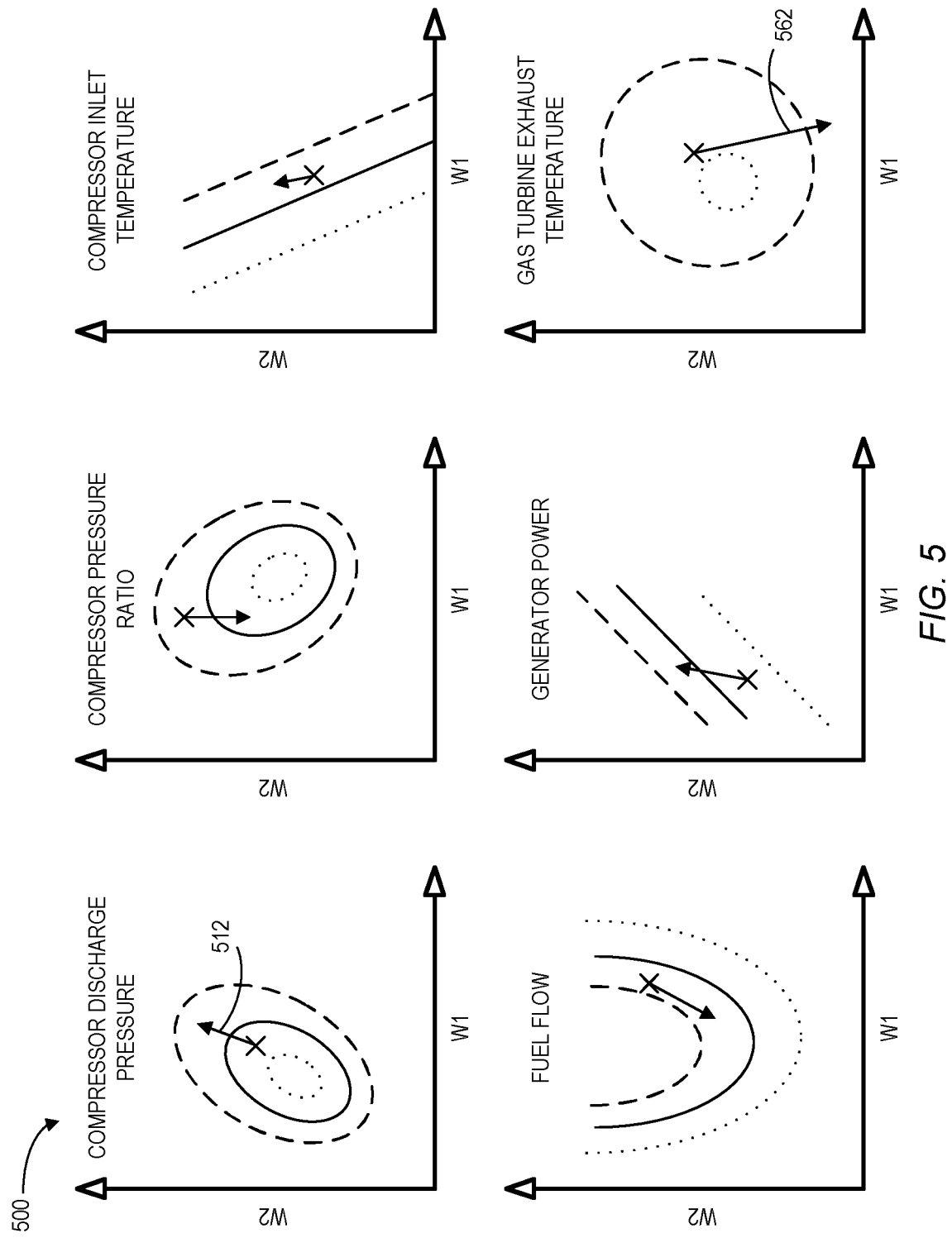

FIG. 5 illustrates 500 subsequent boundaries and feature vectors for these parameters. Consider, for example, a feature vector movement 512 for the compressor discharge pressure. Even though feature vector 512 has moved, it is still within the maximum and minimum boundaries and, as a result, normal operation of that monitoring node may be determined. This is the case for the first five graphs in FIG. 5. In this example, a feature vector movement 562 for the gas turbine exhaust temperature has exceeded with maximum boundary and, as a result, abnormal operation of that monitoring node may be determined. For example, a threat may exist for the exhaust temperature scale factor, which is a corrective value. The result is that the feature for the intermediary monitoring node signal feature vector illustrated in FIG. 5 moves 562 such that it is anomalous. The algorithm detects this cyber-attack, and two parallel actions might be initiated. One action may be post processing of the signal to discover what was attacked, in this case if the system has been monitoring each exhaust thermocouple, it may conclude that none of them are currently abnormal. Therefore, it may be determined that something used to calculate this feature was attacked. The other action may be to continually monitor and detect additional attacks. Such an approach may facilitate a detection of multiple signal attacks.

Given the example of FIG. 5, assume that the gas turbine exhaust temperature signal was attacked. This may cause the system to respond in such a way so as to put other signals into an abnormal state. This is illustrated 600 in FIG. 6, where the attack has already been detected and now other signals shown to be abnormal. In particular, feature movement for the compressor discharge pressure 612, compressor pressure ratio 622, compressor inlet temperature 632, and fuel flow 642 have all become abnormal (joining the feature vector for the gas turbine exhaust temperature 662). Note that the feature vector for generator power did not become abnormal. In order to decide whether or not these signals 612, 622, 632, 642 are truly currently under attack, a historical batch with pertinent feature vector information may be kept for some duration of time. Then when an attack is detected on another signal, this batch is examined, and the time at which the confirmed attack on gas turbine exhaust temperature as well as several subsequent elements is analyzed.

Note that one signal rationalization might be associated with a system time delay. That is, after a sensor is attacked there might be a period of time before the system returns to a steady state. After this delay, any signal that becomes anomalous might be due to an attack as opposed to the system responding.

The current methods for detecting abnormal conditions in monitoring nodes are limited to FDIA (which itself is very limited). The cyber-attack detection and localization algorithms described herein can not only detect abnormal signals of sensors, but can also detect signals sent to auxiliary equipment, control intermediary parameters and/or control commands. The algorithm can also understand multiple signal attacks. One challenge with correctly identifying a cyber-attack threat is that it may occur with multiple sensors being impacted by malware. According to some embodiments, an algorithm may identify in real-time that an attack has occurred, which sensor(s) are impacted, and declare a fault response. To achieve such a result, the detailed physical response of the system must be known to create acceptable decision boundaries. This might be accomplished, for example, by constructing data sets for normal and abnormal regions by running Design of Experiments ("DoE") experiments on high-fidelity models. A data set for each sensor might comprise a feature vector for given threat values (e.g., turbine speed, thermocouple scale factor, etc.). Full factorial, Taguchi screening, central composite and Box-Behnken are some of the known design methodologies used to create the attack space. When models are not available, these DoE methods are also used to collect data from real-world power generator systems. Experiments may be run at different combinations of simultaneous attacks. In some embodiments, the system may detect degraded/faulty operation as opposed to a cyber-attack. Such decisions might utilize a data set associated with a degraded/faulty operating space. At the end of this process, the system may create data sets such as "attack v/s normal" and "degraded v/s normal" for use while constructing decision boundaries. Further note that a decision boundary may be created for each signal using data sets in feature space. Various classification methods may be used to compute decision boundaries. For example, binary linear and non-linear supervised classifiers are examples of methods that could be used to obtain a decision boundary.

Figure 6:
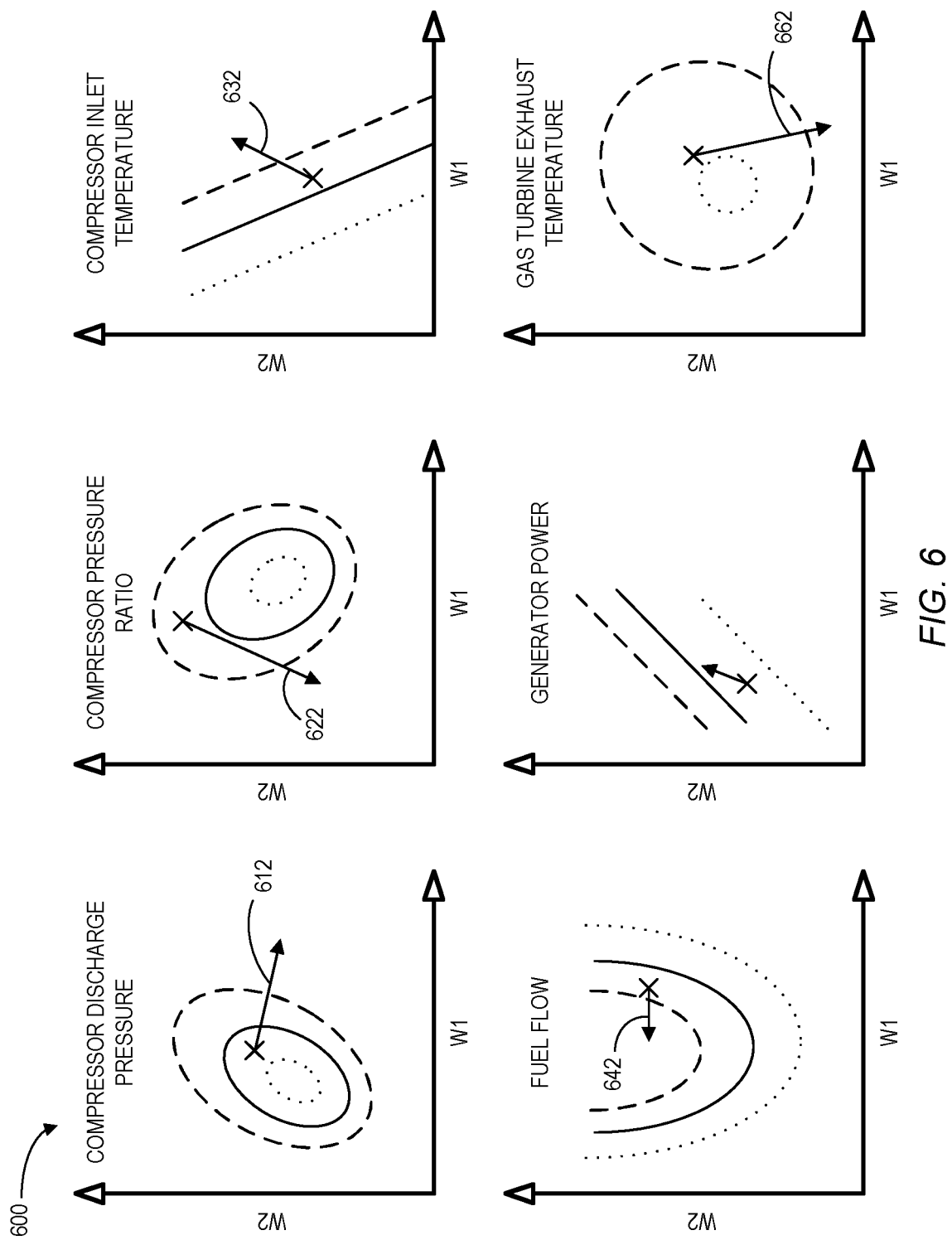

In some cases, multiple vector properties might be examined, and the information described with respect to FIGS. 4 through 6 may be processed to determine if the signal had been trending in a specific direction as the attack was detected (or if it had just been moving due to noise). Had the signal been uniformly trending as the attack took place, then this signal is a response to the original attack and not an independent attack.

Figure 7:
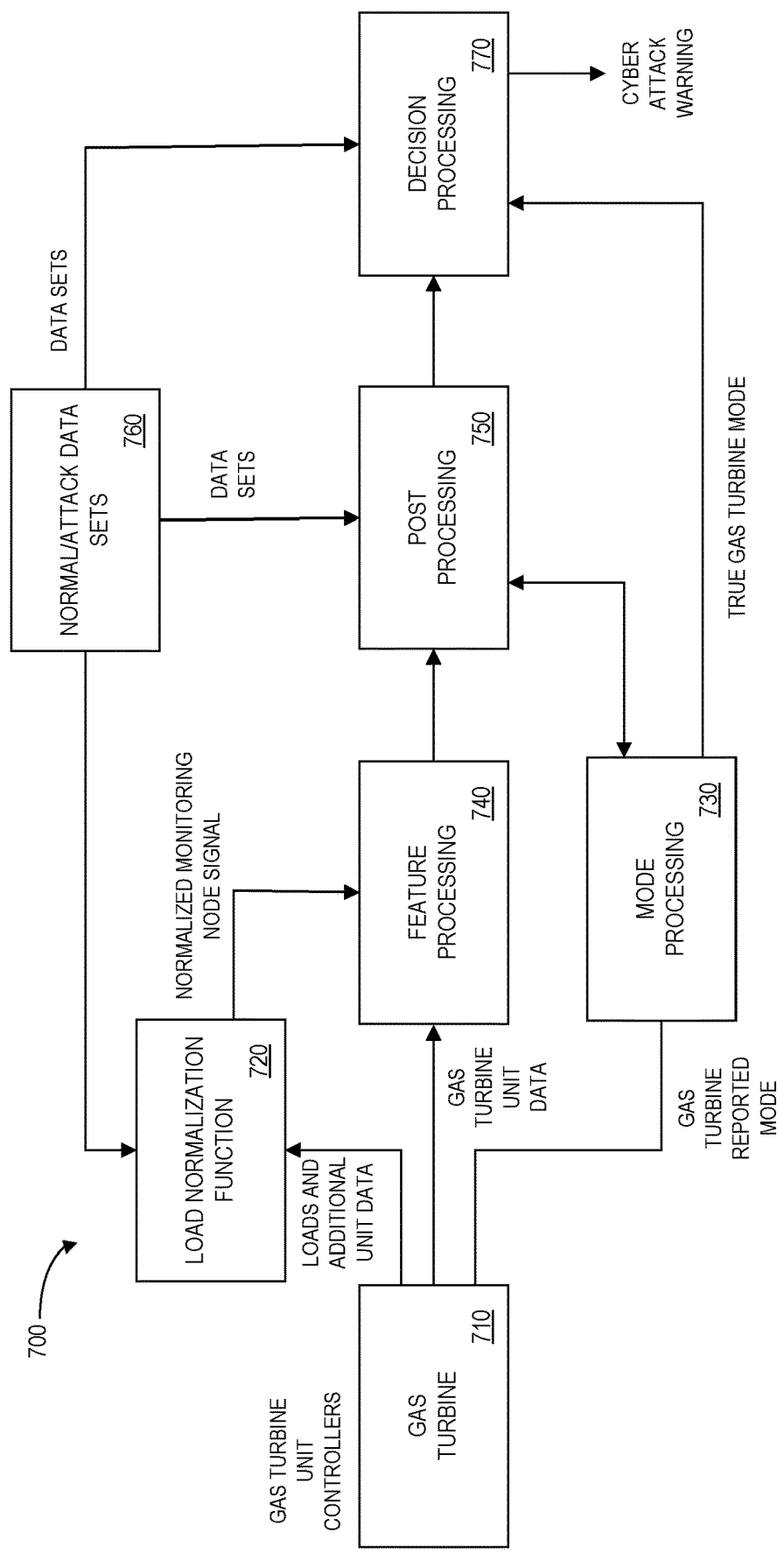
FIG. 7 illustrates a block diagram view of a cyber-attack detection system in accordance with some embodiments.

Note that an industrial asset control system may be associated with non-linear operations over a range of operating parameters (e.g., loads, temperatures, etc.). As a result, data variations can be substantial and determining when a cyber threat is present based on operation of the control system may be difficult. FIG. 7 illustrates a block diagram view of a cyber-attack detection system 700 in accordance with some embodiments. In particular, the system 700 illustrates a gas turbine 710 (e.g., associated with gas turbine unit controllers) that transmits information about loads (e.g., gas turbine loads, Adaptive Real-time Engine Simulation ("ARES" loads, etc.) to a load normalization function 720. The gas turbine 710 may also transmit information, to mode processing 730 (e.g., a gas turbine reported mode of operation) and feature processing 740 (e.g., gas turbine unit data). As will be described, the load normalization function 720 may transmit a normalized monitoring node signal to feature processing 740. Post processing 750 may receive information from feature processing 740 and transmit data to decision processing 770 (which can automatically create a cyber-attack warning based at least in part on data sets received from a normal/attack data sets storage unit 760). Thus, some embodiments may compute normalized monitoring node signals dynamically based on turbine load or temperature levels and temporal time-series signals. This normalization may provide capabilities to perform attack detection for different load conditions.

Note that embodiments might utilize temporal and/or spatial normalization. Temporal normalization may provide normalization along a time axis. Spatial normalization may be used to normalize signals along multiple nodes (e.g., sensor axis). In either case, the normalized signals may then be used to perform attack detection using feature extraction and comparisons to decision boundaries. Sensor, actuator, and controller node time-series data may be processed in substantially real-time to extract "features" from this data. The feature data may then be compared to a decision boundary to determine if a cyber-attack has occurred to the system. A similar approach may be used for detecting attacks in spatially normalized data.

The processing of the real-time data may utilize the normal operating point of the gas turbine 710. This normal operating point might be determined, for example, based on system operating modes, external conditions, system degradation factor, fuel input, etc. The real-time measured sensor data, actuator data, and controller nodes data may be processed such that a difference between actual and nominal values is computed and this difference, or delta, is normalized with the expected operating conditions coefficients. Note that turbine load level (e.g., as represented by Mega Watts ("MW")) may be computed based on multiple measurements, and a load may be estimated from an adaptive real time engine model.

According to some embodiments, the following may be performed off-line (not real time). For a given turbine mode, the gas turbine 710 operation may be simulated using high fidelity models. The load level may be changed from a lowest operating point to a highest operating point (e.g., using step changes every predefined time interval). This simulated data produces a number of normal running data files at varying load levels. Taking one of these files, the load level may be averaged and categorized into a pre-defined load level resolution (e.g., averaged to the nearest 0.25 MW). Using these normalization packets as an input to processing of the time series signals may facilitate dynamic normalization when running in real time. These outputs from the dynamic normalization process may then be then used in a feature discovery process.

Figure 8:
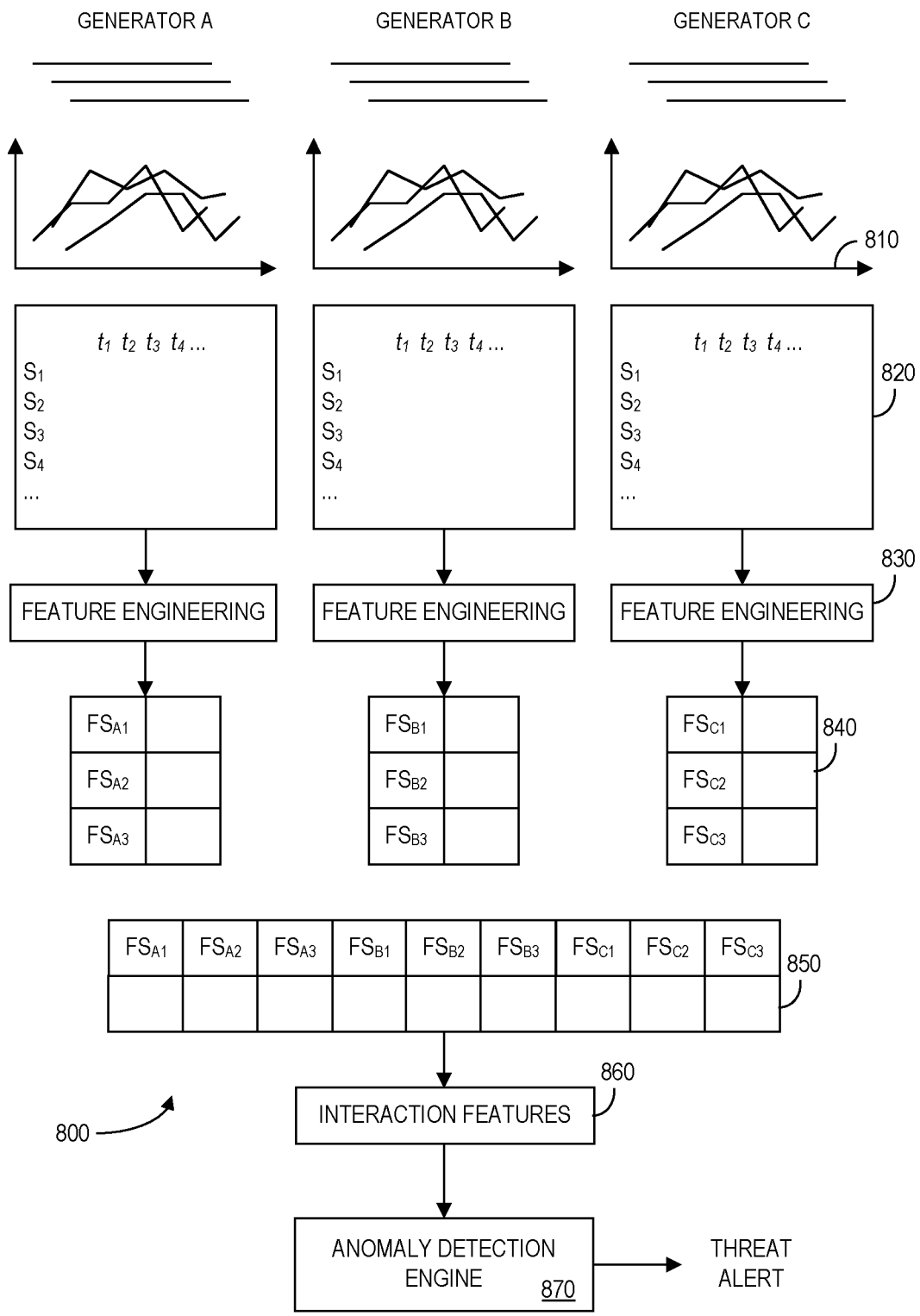
FIG. 8 is an example of a global threat protection system in accordance with some embodiments.

FIG. 8 is an example of a global threat protection system 800 in accordance with some embodiments. In particular, system includes three generators (A, B, and C) and batches of values 810 from threat nodes are collected for each generated over a period of time (e.g., 30 to 50 seconds). According to some embodiments, the batches of values 810 from threat nodes overlap in time. The values 810 from threat nodes may, for example, be stored in a matrix 820 arranged by time ($t_1$, $t_2$, etc.) and by type of threat node ($S_1$, $S_2$, etc.). Feature engineering components 830 may use information in each matrix 820 to create a feature vector 840 for each of the three generators (e.g., the feature vector 840 for generator C might include $FS_{C1}$, $FS_{C2}$, etc.). The three feature vectors 840 may then be combined into a single global feature vector 850 for the system 800. Interaction features 860 may be applied (e.g., associated with A*B*C, A+B+C, etc.) and an anomaly detection engine 870 may compare the result with a decision boundary and output a threat alert signal when appropriate. As will be described, embodiments may tune feature and boundary parameters for both the local feature vectors 840 and the global feature vector 850 to improve performance of the threat detect system 800.

Figure 9:
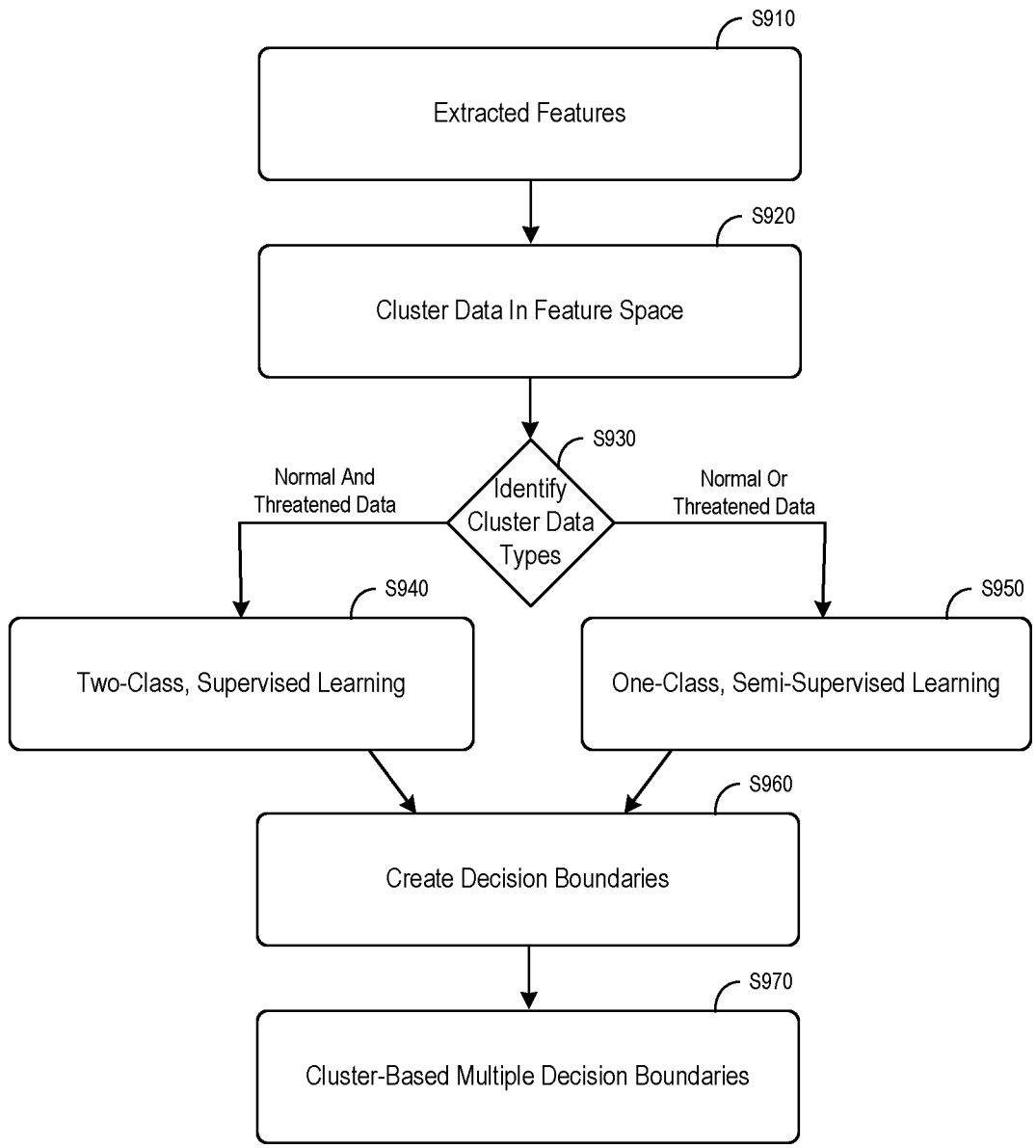
FIG. 9 is a training method for threat detection according to some embodiments.

Note that the local and/or global features described with respect to FIG. 8 may be used to select an appropriate decision boundary (separating normal operation from threatened operation) in accordance with a clustering process. For example, FIG. 9 is a training method for threat detection according to some embodiments. At S910, features may be extracted and the system may cluster data in feature space at S920. For example, a space data source might store, for each of a plurality of monitoring nodes, a series of monitoring node values over time that represent a normal operation of the industrial asset control system and/or a threatened operation of the industrial asset control system. A threat detection model creation computer, coupled to the space data source, may receive the series of monitoring node values and generate a set of feature vectors. According to some embodiments, at least some of the monitoring node values are associated with a high fidelity equipment model. The threat detection model creation computer may then identify a first cluster in the set of feature vectors and a second cluster in the set of feature vectors. According to some embodiments, the threat detection model creation computer may also compute and store a centroid location in association with each cluster. Some examples described herein are associated with two clusters, but embodiments may be associated with any plurality of clusters. The number of clusters may be selected, for example, during an off-line simulation based on an optimization of system performance (e.g., to obtain a high detection rate and low false positive rate).

Note that the identification of clusters described in connection with FIG. 9 might be associated with, for example, a K-means clustering process. As used herein, the term "K-means" clustering process might refer to, for example, a method of vector quantization wherein n observations are partitioned into k clusters. For example, each observation might belong to the cluster with the nearest mean (e.g., serving as a prototype of the cluster). Note that, in some embodiments, a number of clusters may be obtained based on achievable performance as determined by Receiver Operating Characteristic ("ROC") statistics. According to some embodiments, efficient heuristic algorithms may be employed (e.g., similar to an expectation-maximization algorithm for mixtures of Gaussian distributions) to facilitate the clustering process.

At S930, the system may identify cluster data types. If the cluster data type identified at S930 includes both normal and threatened operational data, a two-class, supervised learning process may be performed at S940. As used herein, the term "supervised" learning may refer to, for example, a machine learning task of inferring a function from training data. The training data may consist of a set of both normal and threatened data. In supervised learning, each example is a pair consisting of an input object (typically a vector) and a desired output value. The supervised learning algorithm may analyze the training data and produce an inferred function, which can be used to categorize data during operation of an industrial asset.

If the cluster data type identified at S930 includes only normal operational data (or only threatened operational data), a one-class, semi-supervised learning process may be performed at S950. As used herein, the term "semi-supervised" learning may refer to, for example, a process between unsupervised learning (without any labeled training data) and supervised learning (with completely labeled training data).

At S960, decision boundaries may be created resulting in a set of multiple cluster-based decision boundaries at S970. For example, the system may automatically calculate a first potential cluster-based decision boundary for a threat detection model based on the first cluster in the set of feature vectors. Similarly, the system may automatically calculate a second potential cluster decision boundary for the threat detection model based on the second cluster in the set of feature vectors. Note that a pre-set number of potential cluster-based decision boundaries might be created based on an achievable optimal level of detection performance (e.g., ROC statistics such as false positive rate, false negative rate, etc.). Cluster centroids may also be store for use during real-time for assisting feature vectors to a correct cluster-based decision boundary.

Figure 10:
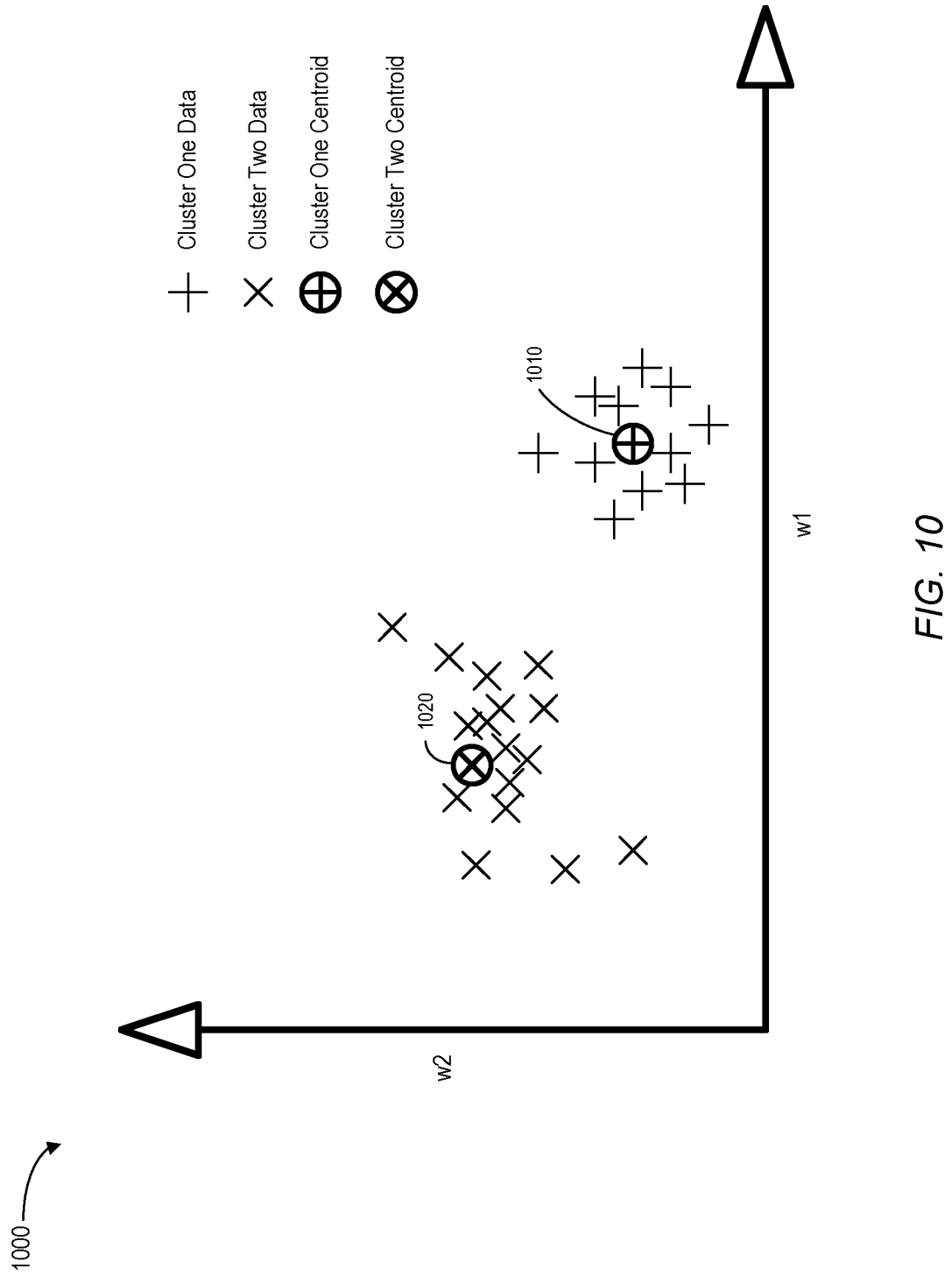
FIG. 10 illustrates clustered data in a two dimensional feature space in accordance with some embodiments.

By way of example, FIG. 10 illustrates 1000 clustered data in a two dimensional feature space in accordance with some embodiments. In particular, the two dimensional feature space is defined by operational characteristics w1 and w2. A set of cluster one data (represented by "+" icons) and a set of cluster two data (represented by "x" icons) are displayed in the space. Further, a centroid location for cluster one 1010 and a centroid location for cluster two 1020 may be computed and located in the two dimensional space as illustrated in FIG. 10.

Note that some embodiments of the present invention provide a method for generating multiple cluster-based decision boundaries for industrial asset cyber-attack detection using data clustering. Such a multi-boundary anomaly detection system may automatically select the correct cluster based on the extracted feature vector from current operation of the industrial asset. Such cluster-based multiple-decision boundaries may help achieve improved detection performance (and reduce false alarms) in the presence of non-linear data and/or skewed data.

For example, real time data may be received from an industrial asset unit controller. The primary features may be extracted from the data using feature discovery processes as described herein. After feature vectors are constructed for variety of data sets (e.g., simulated or field-recorded "attack" data, "normal" operating data, etc.), these vectors are processed to create multiple cluster-based decision boundaries. According to some embodiments, the extracted feature data vectors are clustered into multiple groups using K-means, K-means++, or any other clustering method. Note that an optimal number of clusters may be selected based on attack detection performance predicted by simulations. Each cluster could be a "normal" only cluster, an "attack" only cluster, or a mixed-data cluster.

Figure 11:
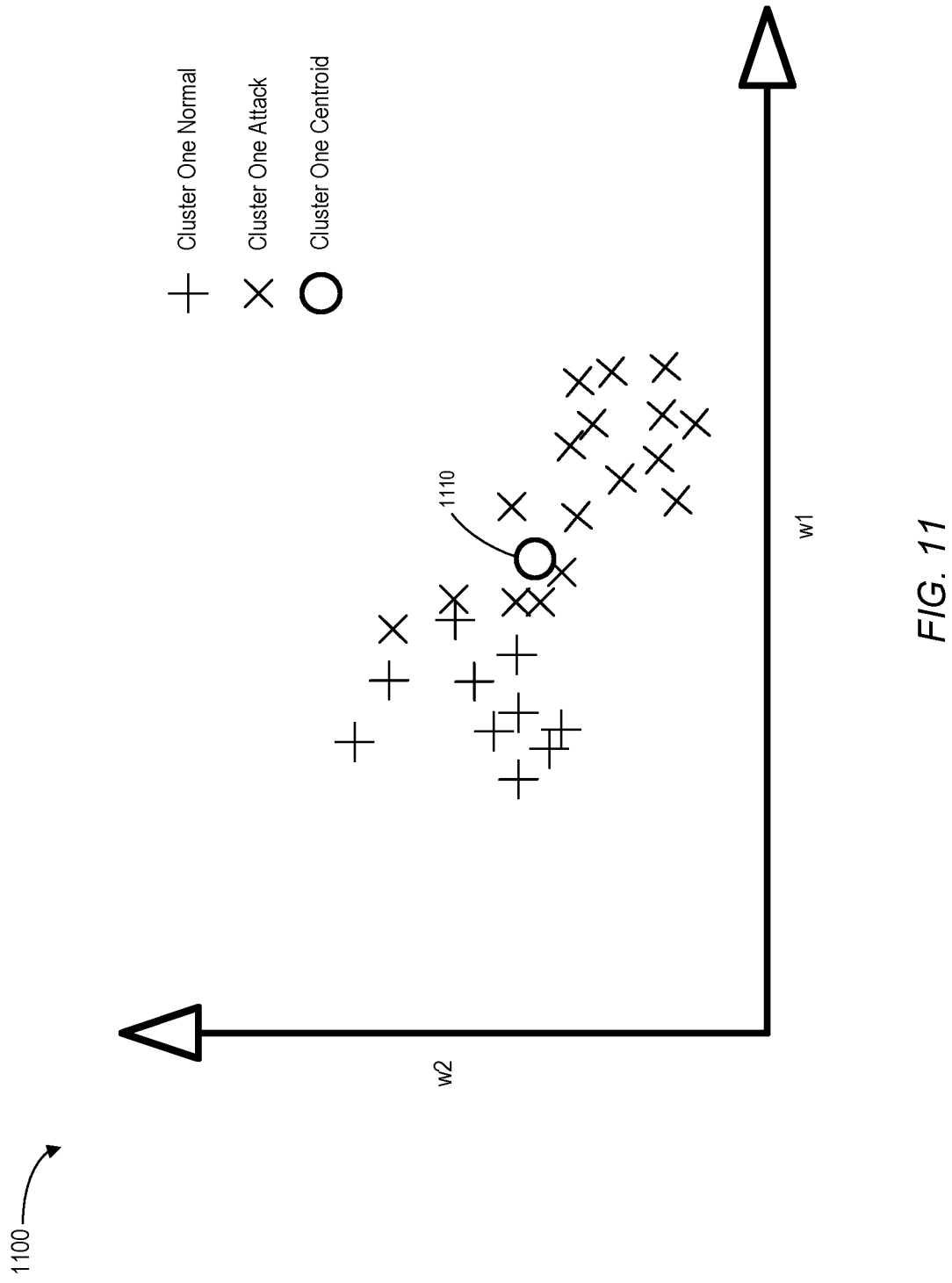
FIG. 11 illustrates normal and attack data in a two-dimensional feature space according to some embodiments.
Figure 12:
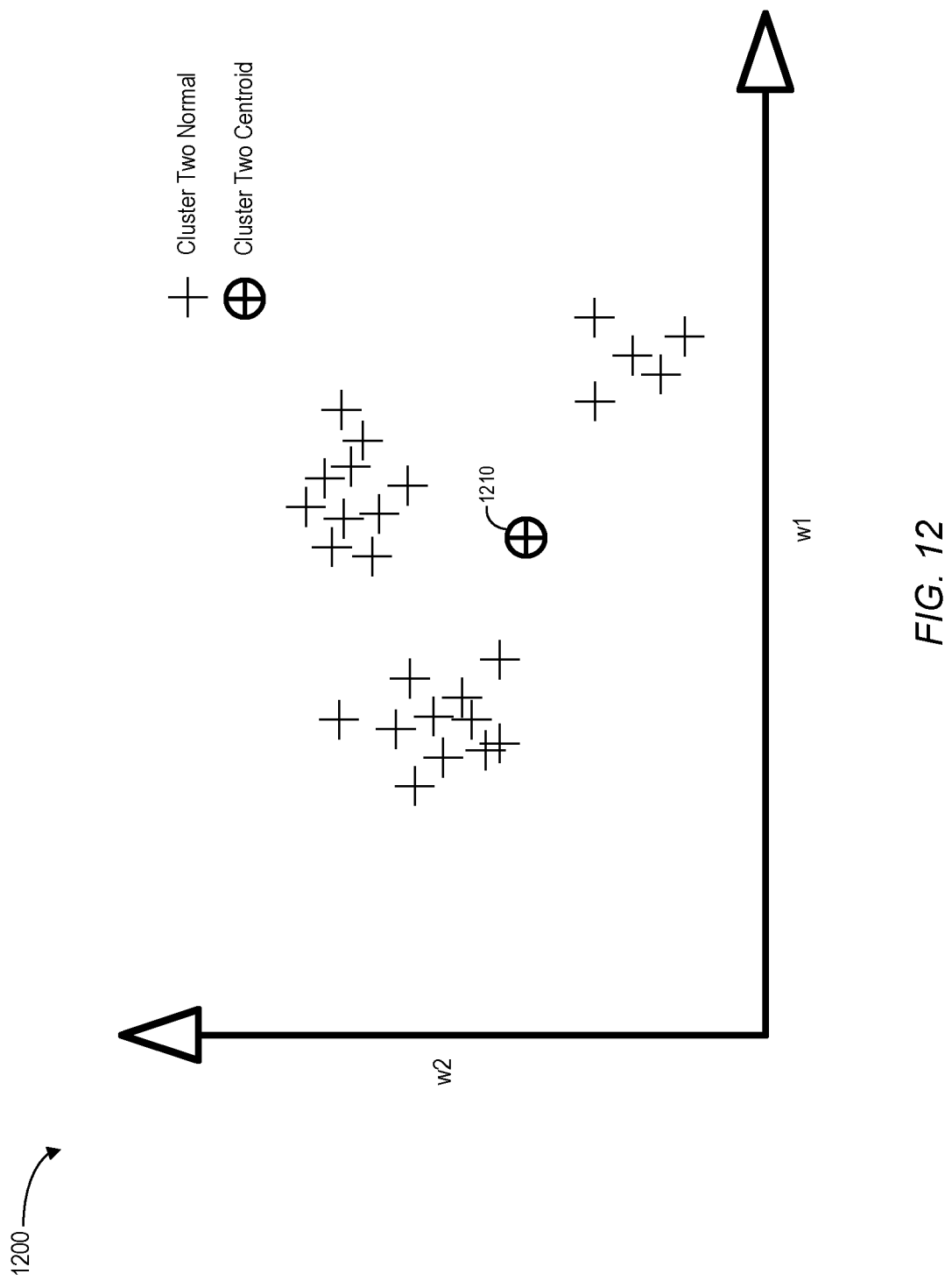
FIG. 12 illustrates normal data in a two-dimensional feature space in accordance with some embodiments.

For example, FIG. 11 illustrates 1100 normal and attack data in a two-dimensional feature space according to some embodiments. In particular, a two dimensional feature space is defined by operational characteristics w1 and w2. A set of normal data for cluster one (represented by "+" icons) and a set of attack data for cluster one (represented by "x" icons) are displayed in the space. Further, a centroid location for cluster one 1110 may be computed and located in the two dimensional space as illustrated in FIG. 11. FIG. 12 illustrates 1200 normal-only data in a two-dimensional feature space in accordance with some embodiments. As before, a two dimensional feature space is defined by operational characteristics w1 and w2. A set of normal cluster two data (represented by "+" icons) is displayed in the space. Note that in this example, the locations of normal cluster two data might occur within multiple groups (e.g., three areas as illustrated in FIG. 12). Further, a centroid location for cluster two 1210 may be computed and located in the two dimensional space as illustrated in FIG. 12.

In general, the system may create a hypersphere around the normal operating points and, as a result, what is outside of that defined region might be considered abnormal (or "threatened"). That is, based on the data type(s) in each cluster, a cluster-based decision boundary may constructed for each data cluster as follows:

For mixed-data clusters (containing both normal and attack training data) a supervised learning method (two-class) is used;
For normal only (or attack only) clusters, a semi-supervised learning (one-class) may be used. The semi-supervised learning model might be, for example, a one-class Support Vector Machine ("SVM") process, a K-Nearest Neighbor ("KNN") algorithm, or any other semi-supervised learning technique.

During operation of the industrial asset, for each observation, the closest cluster may be selected (based on an observation distance in feature space to centroid) in the cluster assignment algorithm (e.g., cluster distance computation) module 353, and the boundary associated with that selected cluster may be used to detect threatened operation. Note that the same definition of distance may be used as when the data was clustered (e.g., Euclidian, city-block, etc.).

Figure 13:
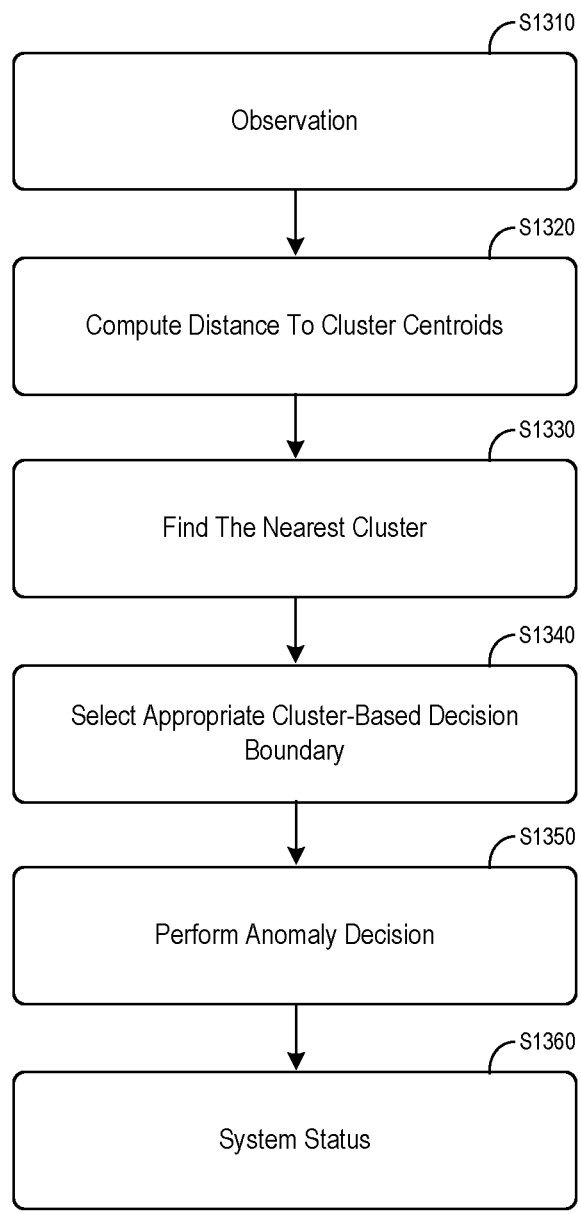
FIG. 13 is an operating method for threat detection according to some embodiments.

FIG. 13 is an operating method for threat detection according to some embodiments. In particular, observation is performed at S1310 and distances to cluster centroids (also called cluster assignment) are computed at S1320. For example, a plurality of real-time monitoring node signal inputs may receive streams of monitoring node signal values over time that represent a current operation of the industrial asset control system. A threat detection computer platform, coupled to the plurality of real-time monitoring node signal inputs and a threat detection model creation computer, may receive the streams of monitoring node signal values and, for each stream, generate a current monitoring node feature vector.

The nearest cluster may then be determined at S1330 and used to select an appropriate cluster-based decision boundary at S1340. For example, the system may select the cluster-based decision boundary that was created for the nearest cluster (the boundary separating a normal state from an abnormal state for that monitoring node in association with that cluster).

The selected cluster-based decision boundary can then be used to perform anomaly detection at S1350 and a current system status may be generated and/or transmitted at S1360 (e.g., indicating that the industrial asset is currently experiencing "normal" or "threatened" operation). For example, the system may compare the generated current monitoring node feature vectors with the selected appropriate cluster-based decision boundary and automatically transmit a threat alert signal based on results of those comparisons. The threat alert signal transmission might be performed, for example, using a cloud-based system, an edge-based system, a wireless system, a wired system, a secured network, any other type of communication system. As used herein, the term "threat" might refer to, for example, an actuator attack, a controller attack, a monitoring node attack, a plant state attack, spoofing, financial damage, unit availability, a unit trip, a loss of unit life, asset damage requiring at least one new part, etc.

Note that a system operation status often cannot be accurately categorized using only one decision boundary. A multiple decision boundary approach may allow for the creation of more accurate decision models and, as a result, more accurate anomaly decisions. Moreover, embodiments described herein may provide for the creation of decision boundaries when only one-class of data is available (using semi-supervised techniques). This will facilitate generation of boundaries using legacy asset data which might only include normal data (that is, the historical data for an industrial asset might not contain any attack data). The definition of an appropriate boundary might be performed in view of, for example, a Receiver Operating Characteristic ("ROC"), true positives, false positives, true negatives, false negatives, an Area Under Curve ("AUC") value, etc.

Figure 14:
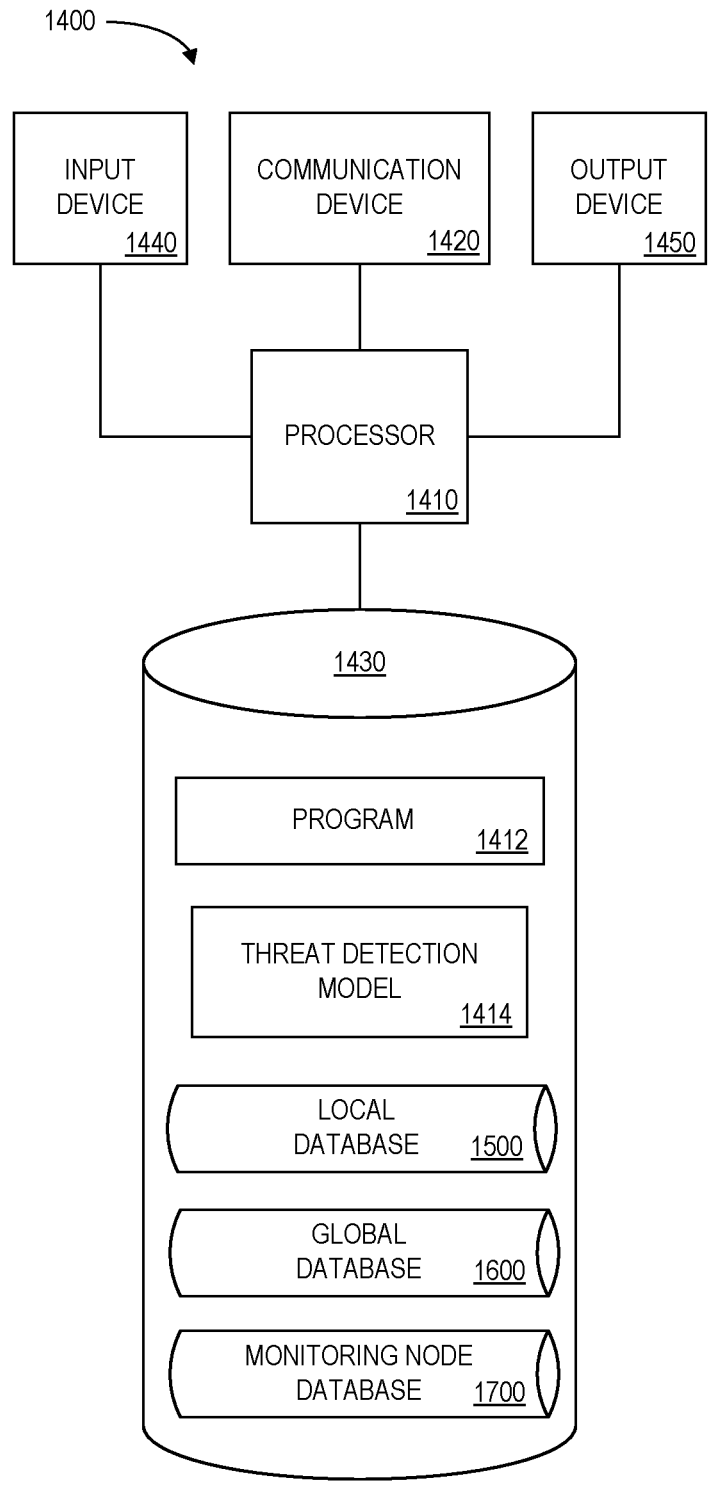
FIG. 14 is a block diagram of an industrial asset control system protection platform according to some embodiments of the present invention.

The embodiments described herein may be implemented using any number of different hardware configurations. For example, FIG. 14 is a block diagram of an industrial asset control system protection platform 1400 that may be, for example, associated with the system 140 of FIG. 1. The industrial asset control system protection platform 1400 comprises a processor 1410, such as one or more commercially available Central Processing Units ("CPUs") in the form of one-chip microprocessors, coupled to a communication device 1420 configured to communicate via a communication network (not shown in FIG. 14). The communication device 1420 may be used to communicate, for example, with one or more remote monitoring nodes, user platforms, etc. The industrial asset control system protection platform 1400 further includes an input device 1440 (e.g., a computer mouse and/or keyboard to input cluster parameters and/or predictive modeling information) and/an output device 1450 (e.g., a computer monitor to render a display, provide alerts, transmit recommendations, and/or create reports). According to some embodiments, a mobile device, monitoring physical system, and/or PC may be used to exchange information with the industrial asset control system protection platform 1400.

The processor 1410 also communicates with a storage device 1430. The storage device 1430 may comprise any appropriate information storage device, including combinations of magnetic storage devices (e.g., a hard disk drive), optical storage devices, mobile telephones, and/or semiconductor memory devices. The storage device 1430 stores a program 1412 and/or a threat detection model 1414 for controlling the processor 1410. The processor 1410 performs instructions of the programs 1412, 1414, and thereby operates in accordance with any of the embodiments described herein. For example, the processor 1410 may receive a series of monitoring node values (representing normal and/or threatened operation of the industrial asset control system) and generate a set of normal feature vectors. The processor 1410 may then automatically determine a plurality of potential cluster-based decision boundaries for a threat detection model.

The programs 1412, 1414 may be stored in a compressed, uncompiled and/or encrypted format. The programs 1412, 1414 may furthermore include other program elements, such as an operating system, clipboard application, a database management system, and/or device drivers used by the processor 1410 to interface with peripheral devices.

As used herein, information may be "received" by or "transmitted" to, for example: (i) the industrial asset control system protection platform 1400 from another device; or (ii) a software application or module within the industrial asset control system protection platform 1400 from another software application, module, or any other source.

In some embodiments (such as the one shown in FIG. 14), the storage device 1430 further stores a local database 1500, global database 1600, and a monitoring node database 1700. Example of databases that may be used in connection with the industrial asset control system protection platform 1400 will now be described in detail with respect to FIGS. 15 through 17. Note that the databases described herein are only examples, and additional and/or different information may be stored therein. Moreover, various databases might be split or combined in accordance with any of the embodiments described herein.

Figure 15:
FIG. 15 is a tabular portion of a local database in accordance with some embodiments.

Referring to FIG. 15, a table is shown that represents the local database 1500 that may be stored at the industrial asset control system protection platform 1400 according to some embodiments. The table may include, for example, entries associated with local features and boundaries of an industrial asset control system. The table may also define fields 1502, 1504, 1506, 1508, 1510 for each of the entries. The fields 1502, 1504, 1506, 1508, 1510 may, according to some embodiments, specify: an industrial asset identifier 1502, local data 1504, a cluster identifier 1506, a centroid 1508, and local features and boundaries 1510. The local database 1500 may be created and updated, for example, off line (non-real time) when a new physical system is monitored or modeled.

The industrial asset identifier 1502 may be, for example, a unique alphanumeric code identifying an industrial asset to be monitored (e.g., a jet turbine system, manufacturing plant, wind farm, etc.). The local data 1504 might represent, for example, historical data, high fidelity model data, etc. The cluster identifier 1506 and centroid 1508 might, for example, associated a set of feature data with a particular "cluster" located around the centroid 1508 (e.g., a location in two dimensional space, three dimensional space, etc.). The local features and boundaries 1510 might represent an appropriate boundary for the cluster (separating normal operation from threatened operation).

Referring to FIG. 16, a table is shown that represents the global database 1600 that may be stored at the industrial asset control system protection platform 1400 according to some embodiments. The table may include, for example, entries associated with global features and boundaries of an industrial asset control system. The table may also define fields 1602, 1604, 1606, 1608 for each of the entries. The fields 1602, 1604, 1606, 1608 may, according to some embodiments, specify: an industrial asset identifier 1602, a global cluster identifier 1604, a centroid 1606, and global features and boundaries 1608. The global database 1600 may be created and updated, for example, off line (non-real time) when a new physical system is monitored or modeled.

The industrial asset identifier 1602 may be, for example, a unique alphanumeric code identifying an industrial asset to be monitored and may be based on, or associated with, the industrial asset identifier 1502 in the local database 1500. The global cluster identifier 1604 and centroid 1606 might, for example, associated a set of global feature data with a particular "cluster" located around the centroid 1606 (e.g., a location in two dimensional space, three dimensional space, etc.). The global features and boundaries 1068 might represent an appropriate boundary for the cluster (separating normal operation from threatened operation).

Referring to FIG. 17, a table is shown that represents the monitoring node database 1700 that may be stored at the industrial asset control system protection platform 1100 according to some embodiments. The table may include, for example, entries identifying monitoring nodes associated with a physical system. The table may also define fields 1702, 1704, 1706, 1708, 1710, 1712 for each of the entries. The fields 1702, 1704, 1706, 1708, 1710, 1712 may, according to some embodiments, specify: a monitoring node identifier 1702, monitoring node values 1704, features 1706, feature vectors 1708, a closest cluster identifier 1710, and a result 1712. The monitoring node database 1700 may be created and updated, for example, when a new physical system is monitored or modeled, threat nodes report values, operating conditions change, etc.

The monitoring node identifier 1702 may be, for example, a unique alphanumeric code identifying a threat node in an industrial asset control system that detects the series of monitoring node values 1704 over time (e.g., in batches of 30 to 50 seconds of data). The monitoring node values 1704 may be used to create the features 1706 and feature vectors 1708 (e.g., in accordance with any of the embodiments described herein). The closest cluster identifier 1710 might indicate the nearest cluster and might be based on or associated with the cluster identifier 1506 in the local database 1500 and/or the global cluster identifier 1604 in the global database 1600. The closest cluster identifier 1710 may be used, for example, to select an appropriate decision boundary to generate the result 1712 (e.g., an "attack" or a "normal" indication).

Thus, embodiments may provide an industrial asset with cyber-attack protection that is able to handle non-linearity and/or data skewing. Moreover, embodiments may provide more accurate sensor/actuator/control node attack processing with proper decision boundaries applicable to the data at each instant. Further, embodiments may allow for the training of attack detection systems using "normal" only historical data. Passive detection of indications of multi-class abnormal operations may be implemented using real-time signals from monitoring nodes. Still further, the detection framework may allow for the development of tools that facilitate proliferation of the invention to various systems (i.e., gas turbines, steam turbines, wind turbines, aviation engines, locomotive engines, power grid, etc.) in multiple geolocations. According to some embodiments, distributed detection systems enabled by this technology (across multiple types of equipment and systems) will allow for the collection of coordinated data to help detect multi-prong attacks. Note that the feature-based approaches described herein may allow for extended feature vectors and/or incorporate new features into existing vectors as new learnings and alternate sources of data become available. As a result, embodiments may detect a relatively wide range of cyber-threats (e.g., stealth, replay, covert, injection attacks, etc.) as the systems learn more about their characteristics. Embodiments may also reduce false positive rates as systems incorporate useful key new features and remove ones that are redundant or less important. Note that the detection systems described herein may provide early warning to industrial asset control system operators so that an attack may be thwarted (or the effects of the attack may be blunted), reducing damage to equipment.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 18:
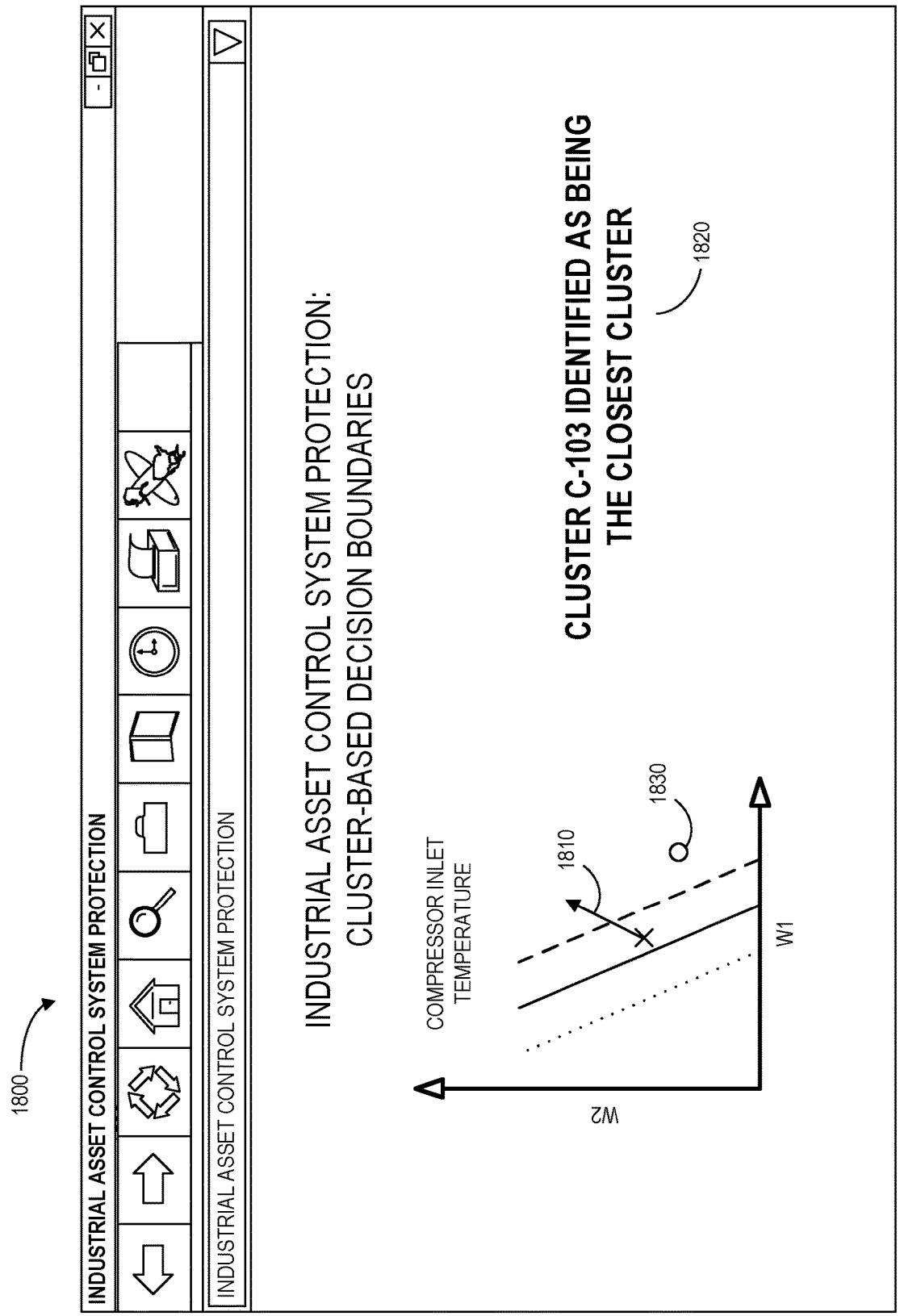
FIG. 18 is a display according to some embodiments.

Note that appropriate clusters may be identified and/or selected by a system and/or be based on user input. For example, FIG. 18 illustrates an interactive Graphical User Interface ("GUI") display 1800 that might display monitoring node information (e.g., including a current feature vector 1810 and decision boundaries selected based on clustering) along with a user notification area 1820 that may be used provide information to an operator, administrator, etc.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on gas turbine generators, any of the embodiments described herein could be applied to other types of assets, such as dams, the power grid, military devices, etc.

According to some embodiments, information about attack statuses may be interwoven between different industrial asset plants. For example, one power plant might be aware of the status of other nodes (in other power plants) and such an approach might further help thwart coordinated cyber-threats. In addition to automatic threat detection, some embodiments described herein might provide systems with an additional cyber layer of defense and be deployable without custom programming (e.g., when using operating data). Some embodiments may be sold with a license key and could be incorporated as monitoring service. For example, boundaries might be periodically updated when equipment at an industrial asset plant is upgraded.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to protect an industrial asset control system, comprising:
   a space data source storing, for each of a plurality of monitoring nodes, a series of monitoring node values over time that represent at least one of: (i) a normal operation of the industrial asset control system, and (ii) a threatened operation of the industrial asset control system; and
   a threat detection model creation computer, coupled to the space data source, to:
   (i) receive the series of monitoring node values and generate a set of feature vectors in multi-dimensional feature space,
   (ii) identify a plurality of multi-dimensional feature space clusters in the set of feature vectors using a K-means process, wherein the number of multi-dimensional feature space clusters is based on achievable performance as determined by Receiver Operating Characteristic ("ROC") statistics, and
   (iii) calculate, automatically by the threat detection model creation computer, a cluster-based decision boundary in the multi-dimensional feature space for each identified multi-dimensional feature space cluster to be utilized by a threat detection model.

2. The system of claim 1, wherein the series of monitoring node values over time represents only the normal operation of the industrial asset control system, and said calculation of cluster-based decision boundaries is associated with a one-class, semi-supervised learning process.

3. The system of claim 1, wherein the series of monitoring node values over time represents only the threatened operation of the industrial asset control system, and said calculation of cluster-based decision boundaries is associated with a one-class, semi-supervised learning process.

4. The system of claim 1, wherein the series of monitoring node values over time represents both the normal and the threatened operation of the industrial asset control system, and said calculation of cluster-based decision boundaries is associated with a two-class, supervised learning process.

5. The system of claim 1, wherein the threat detection model creation computer is further to compute and store a centroid location in association with each cluster.

6. The system of claim 1, wherein a plurality of cluster-based decision boundaries in the multi-dimensional feature space are associated with a first cluster in a set of feature vectors.

7. The system of claim 1, wherein at least one of the series of monitoring node values is generated by a high fidelity equipment model.

8. The system of claim 1, wherein said identification and automatic calculation are performed based at least in part on an online update received from a remote industrial asset control system information source.

9. The system of claim 1, further comprising:
a plurality of real-time monitoring node signal inputs to receive streams of monitoring node signal values over time that represent a current operation of the industrial asset control system; and
a threat detection computer platform, coupled to the plurality of real-time monitoring node signal inputs and the threat detection model creation computer, to:
(i) receive the streams of monitoring node signal values,
(ii) for each stream of monitoring node signal values, generate a current monitoring node feature vector in the multi-dimensional feature space,
(iii) select an appropriate cluster-based decision boundary in the multi-dimensional features space based on distances between a feature vector and cluster centroids,
(iv) compare the feature vector to the appropriate cluster-based decision boundary separating a normal state from an abnormal state for that monitoring node in association with a cluster,
(v) compare the generated current monitoring node feature vectors with the selected appropriate cluster-based decision boundary, and
(vi) automatically transmit a threat alert signal based on results of said comparisons.

10. The system of claim 9, wherein the threat alert signal transmission is performed using at least one of: a cloud-based system, an edge-based system, a wireless system, a wired system, a secured network, and a communication system.

11. The system of claim 10, wherein the threat is associated with an actuator attack on the industrial asset control system.

12. A computerized method to protect an industrial asset control system, comprising:
receiving, at a threat detection model creation computer from a space data source for each of a plurality of monitoring nodes, a series of monitoring node values over time that represent at least one of: (i) a normal operation of the industrial asset control system, and (ii) a threatened operation of the industrial asset control system;
generating a set of feature vectors in multi-dimensional feature space based on the received monitoring node values;
identifying a plurality of multi-dimensional feature space clusters in the set of feature vectors using a K-means process, wherein the number of multi-dimensional feature space clusters is based on achievable performance as determined by Receiver Operating Characteristics ("ROC") statistics; and
automatically calculating, by the threat detection model creation computer using a series of feature vectors, a cluster-based decision boundary in the multi-dimensional feature space for each identified multi-dimensional feature space cluster to be utilized by a threat detection model.

13. The method of claim 12, wherein the series of monitoring node values over time represent only the normal operation of the industrial asset control system, and said calculation of cluster-based decision boundaries is associated with a one-class, semi-supervised learning process.

14. The method of claim 12, wherein the series of monitoring node values over time represent only the threatened operation of the industrial asset control system, and said calculation of cluster-based decision boundaries is associated with a one-class, semi-supervised learning process.

15. The method of claim 12, wherein the series of monitoring node values over time represent both the normal and the threatened operation of the industrial asset control system, and said calculation of cluster-based decision boundaries is associated with a two-class, supervised learning process.

16. The method of claim 12, wherein the threat detection model creation computer is further to compute and store a centroid location in association with each of a plurality of clusters.

17. The method of claim 12, further comprising:
receiving, by a threat detection computer platform, streams of monitoring node signal values over time that represent a current operation of the industrial asset control system;
for each stream of monitoring node signal values, generating, by the threat detection computer platform, a current monitoring node feature vector;
selecting, by the threat detection computer platform, an appropriate cluster-based decision boundary based on distances between a feature vector and cluster centroids, the appropriate cluster-based decision boundary separating a normal state from an abnormal state for that monitoring node in association with a cluster;
comparing, by the threat detection computer platform, the generated current monitoring node feature vectors with the selected appropriate cluster-based decision boundary; and
automatically transmitting a threat alert signal based on results of said comparisons.

18. A non-transient, computer-readable medium storing instructions to be executed by a processor to perform a method of protecting an industrial asset control system, the method comprising:
receiving, from a space data source for each of a plurality of monitoring nodes, a series of monitoring node values over time that represent at least one of: (i) a normal operation of the industrial asset control system, and (ii) a threatened operation of the industrial asset control system;
generating a set of feature vectors in multi-dimensional feature space based on the received monitoring node values;
identifying a plurality of multi-dimensional feature space clusters in the set of feature vectors using a K-means process, wherein the number of multi-dimensional feature space clusters is based on achievable performance as determined by Receiver Operating Characteristics ("ROC") statistics; and
automatically calculating a cluster-based decision boundary in the multi-dimensional feature space for each identified multi-dimensional feature space cluster to be utilized by a threat detection model.

19. The medium of claim 18, wherein execution of the instructions further results in:
- receiving streams of monitoring node signal values over time that represent a current operation of the industrial asset control system;
- for each stream of monitoring node signal values, generating a current monitoring node feature vector;
- selecting an appropriate cluster-based decision boundary based on distances between a feature vector and cluster centroids, the appropriate cluster-based decision boundary separating a normal state from an abnormal state for that monitoring node in association with a cluster;
- comparing the generated current monitoring node feature vectors with the selected appropriate cluster-based decision boundary; and
- automatically transmitting a threat alert signal based on results of said comparisons.

* * * * *